US012643536B2

(12) United States Patent
Martin et al.

(10) Patent No.: US 12,643,536 B2
(45) Date of Patent: Jun. 2, 2026

(54) APPARATUS AND METHOD FOR CONTROLLING VEHICLE MOVEMENT TO ALIGN VEHICLE LONGITUDINALLY TO A DETECTED OBJECT

(71) Applicant: JAGUAR LAND ROVER LIMITED, Whitley (GB)

(72) Inventors: Patrick Martin, Beaverton, OR (US); David Pettinger, Coventry (GB); Jonathan Randall, Leamington Spa (GB); Ivan Epling, Coventry (GB); Mutlu Isik, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 620 days.

(21) Appl. No.: 17/333,897

(22) Filed: May 28, 2021

(65) Prior Publication Data

US 2022/0379882 A1 Dec. 1, 2022

(51) Int. Cl.
B60W 30/06 (2006.01)
B60W 10/18 (2012.01)
(Continued)

(52) U.S. Cl.
CPC ........ B60W 30/09 (2013.01); B60W 30/0956 (2013.01); B60W 10/18 (2013.01);
(Continued)

(58) Field of Classification Search
CPC .. B60W 30/09; B60W 30/0956; B60W 10/18; B60W 10/20; B60W 60/001; B60W 2556/45; B60W 30/06; B62D 15/0285
See application file for complete search history.

(56) References Cited

U.S. PATENT DOCUMENTS 9,555,804 B2 * 1/2017 Blake ................... G01S 13/931
11,092,688 B1 * 8/2021 Wang ................... G01S 15/876
(Continued)

FOREIGN PATENT DOCUMENTS

EP 3453595 A1 * 3/2019 ........... B60W 30/06
GB 2574384 A * 12/2019 ........... B60K 28/04
(Continued)

OTHER PUBLICATIONS

Morales et al., "Laser-Based Control Law for Autonomous Parallel and Perpendicular Parking," 2018 Second IEEE International Conference on Robotic Computing (IRC), Laguna Hills, CA, USA, 2018, pp. 64-71, doi: 10.1109/IRC.2018.00018. (Year: 2018).*

*Primary Examiner* — Daniel M. Robert
(74) *Attorney, Agent, or Firm* — Troutman Pepper Locke LLP; Dustin B. Weeks; Nicholas H. Doss

(57) ABSTRACT

A system including vehicle and control system for a vehicle, the control system having one or more controllers and being arranged to: receive a request signal indicative of a request to move the vehicle in a first direction and sensor data indicative of one or more objects in an environment of the vehicle; and output a movement signal to cause an application of torque to one or more wheels of the vehicle to move the vehicle in the first direction in dependence on the request signal and to align the vehicle longitudinally to a detected first object in dependence on the sensor data, the aligned vehicle being positioned at least partly alongside the first object.

20 Claims, 7 Drawing Sheets

(51) Int. Cl.
| | |
|---|---|
| *B60W 10/20* | (2006.01) |
| *B60W 30/09* | (2012.01) |
| *B60W 30/095* | (2012.01) |
| *B60W 60/00* | (2020.01) |

(52) U.S. Cl.
CPC ............. *B60W 10/20* (2013.01); *B60W 30/06* (2013.01); *B60W 60/001* (2020.02); *B60W 2556/45* (2020.02)

(56) References Cited

U.S. PATENT DOCUMENTS

| | | | | |
|---|---|---|---|---|
| 2013/0162829 | A1* | 6/2013 | Kadowaki | B60R 1/27 348/148 |
| 2015/0045991 | A1* | 2/2015 | Schwitters | B60W 30/06 701/2 |
| 2017/0028985 | A1* | 2/2017 | Kiyokawa | G01S 15/876 |
| 2017/0132482 | A1* | 5/2017 | Kim | B60R 1/27 |
| 2017/0369078 | A1* | 12/2017 | Freistadt | B60W 30/06 |
| 2018/0308358 | A1* | 10/2018 | Hayakawa | G08G 1/143 |
| 2018/0339700 | A1* | 11/2018 | Lee | G06V 20/588 |
| 2019/0217856 | A1* | 7/2019 | Inoue | G08G 1/16 |
| 2019/0286135 | A1* | 9/2019 | Yasuda | G05D 1/0223 |
| 2019/0310624 | A1* | 10/2019 | Bettger | B60W 50/14 |
| 2019/0324471 | A1* | 10/2019 | Kim | G01S 17/931 |
| 2020/0001862 | A1* | 1/2020 | Luo | G05D 1/0212 |
| 2020/0298835 | A1* | 9/2020 | Suzuki | B62D 1/00 |
| 2020/0398826 | A1* | 12/2020 | Tsujino | G08G 1/168 |
| 2021/0039666 | A1* | 2/2021 | Jeong | B62D 15/027 |
| 2021/0179078 | A1* | 6/2021 | Nakada | G06V 20/586 |
| 2021/0179079 | A1* | 6/2021 | Hara | B60W 30/06 |
| 2022/0274589 | A1* | 9/2022 | Gao | G06F 3/04845 |
| 2022/0365527 | A1* | 11/2022 | Suzuki | G06F 3/0488 |
| 2022/0379882 | A1* | 12/2022 | Martin | B60W 30/09 |

FOREIGN PATENT DOCUMENTS

| | | | | |
|---|---|---|---|---|
| JP | 2012056534 A | * | 3/2012 | |
| WO | WO-2019058578 A1 | * | 3/2019 | B60R 21/00 |

* cited by examiner

110

APPARATUS AND METHOD FOR CONTROLLING VEHICLE MOVEMENT TO ALIGN VEHICLE LONGITUDINALLY TO A DETECTED OBJECT

TECHNICAL HELD

The present disclosure relates to controlling movement of a vehicle and particularly, but not exclusively, to controlling an alignment of the vehicle during movement. Aspects of the present invention relate to a control system, to systems, to a method, to a vehicle, and to computer software.

BACKGROUND

It is known for a vehicle to perform a defined maneuver, such as an autonomous, or semi-autonomous, parking maneuver. The vehicle may be instructed by a user to perform the maneuver remotely i.e. via a mobile device at which a user input is received to instruct the maneuver. Environment sensing means of the vehicle are used to determine a location of features in a vicinity of the vehicle such as, although not exclusively, markings, walls, posts, other vehicles etc. The vehicle may then be instructed, such as via the mobile device, to move to a parked location in relation to the features. For example, it may be desired for a vehicle to move into a parking space in a parking structure adjacent a wall. The parking space may be located with the wall perpendicular to a longitudinal axis of the parking space, such that the vehicle moves into the parking space in either a forward or reverse direction.

As a defined maneuver, the vehicle may move forwards or backwards into a space until the vehicle is sensed to be a predetermined distance from an object in or near the space. As a result, the vehicle may be inefficiently positioned in the space. For example, a vehicle may be instructed to move forward into a garage. If the vehicle enters the garage at an angle, the vehicle may be oriented diagonally across the garage after completing the maneuver. This may be problematic, as movement or other activities in the garage may be impeded by the inefficiently positioned vehicle.

Furthermore, changing an orientation and position of the vehicle in the space may require a user to instruct the vehicle to perform one or more further defined maneuvers (or even take control of the vehicle manually) until a satisfactory orientation and position is obtained. This causes yet further frustration, and places a burden on a user.

It is an object of embodiments of the invention to at least mitigate one or more of the problems of the prior art.

SUMMARY

Aspects and embodiments of the invention provide a control system, a controller, a system, a method, a vehicle and computer software as claimed in the appended claims.

According to an aspect of the present invention, there is provided a control system for a vehicle, the control system comprising one or more controller, the control system being arranged to: receive a request signal indicative of a request to move the vehicle in a first direction and sensor data; and output a movement signal to cause an application of torque to one or more wheels of the vehicle to move the vehicle in the first direction and to align the vehicle longitudinally to a detected first object, in dependence on one or more of the request signal and the sensor data.

According to another aspect of the present invention, there is provided a control system for a vehicle, the control system comprising one or more controller, the control system being arranged to: receive a request signal indicative of a request to move the vehicle in a first direction and sensor data indicative of one or more objects in an environment of the vehicle; and output a movement signal to cause an application of torque to one or more wheels of the vehicle to move the vehicle in the first direction in dependence on the request signal and to align the vehicle longitudinally to a detected first object in dependence on the sensor data, the aligned vehicle being positioned at least partly alongside the first object. Advantageously, the vehicle may be more efficiently positioned at the end of the movement due to the aligning to the first object.

The first direction may be forwards or backwards (i.e., reverse). In an example, the first direction being forwards may correspond to a rotation of the wheels of the vehicle which causes the vehicle to move forwards. In an example, the first direction being forwards may correspond to another rotation of the wheels of the vehicle which causes the vehicle to move backwards.

Optionally, for the aligned vehicle to be positioned at least partly alongside the first object, the aligned vehicle may be adjacent to the first object.

The control system may comprise one or more of: an input circuit arranged to receive the request signal and the sensor data; an output circuit arranged to output the movement signal; and a control circuit arranged to control at least one of the input circuit and the output circuit.

The control system described above, wherein an object in the environment of the vehicle may be detected to be the first object in dependence on a property of the object as indicated by the sensor data.

The control system described above, wherein an object may detected to be the first object in dependence on at least one dimension of the object, as indicated by the sensor data, being equal to or greater than a corresponding predetermined value. Advantageously, the vehicle may be controlled to align to larger objects only, avoiding the need to repeatedly reposition the vehicle.

The control system described above, wherein, optionally, one or more of: the at least one dimension of the object may include a length of a surface of the object and a corresponding predetermined value may be a predetermined first value set in dependence on a length associated with the vehicle; and the at least one dimension of the object may include a height of the object and a corresponding predetermined value may be a predetermined second value. Advantageously, setting the predetermined first value in dependence on a length associated with the vehicle allows for the aligning to be based on the vehicle itself. For example, a shorter vehicle may align to an object that a larger vehicle would not align to.

Optionally, the length associated with the vehicle may be a longitudinal length of the vehicle.

The control system as described above, wherein the control system may be arranged to: output the movement signal to control a direction of one or more wheels of the vehicle relative to the longitudinal axis of the vehicle to move the vehicle in the first direction towards the first object and to align the vehicle with the first object.

The control system as described above, wherein controlling the direction of two or more wheels of the vehicle may comprise: controlling the direction of one or more wheels of the vehicle relative to the longitudinal axis of the vehicle to angle towards the first object or to angle away from the first object. Advantageously, this may allow for movement towards the first object and aligning with the first object for both forwards and backwards movement of the vehicle.

The control system as described above, wherein aligning the vehicle with the first object may comprise: moving the vehicle in at least the first direction while further controlling a direction of one or more wheels of the vehicle relative to the longitudinal axis of the vehicle until the longitudinal axis of the vehicle is in parallel with a surface of the first object. Advantageously, this may allow for good aligning of the vehicle and the object.

The control system as described above, wherein the control system may be arranged to: determine alignment of the vehicle to be complete when the longitudinal axis of the vehicle is in parallel (or substantially in parallel) with the surface of the first object and the first object is detected to be within a predetermined first distance from the vehicle; and stop the vehicle in dependence on determining alignment of the vehicle to be complete. Advantageously, this may prevent unnecessary movement of the vehicle.

Optionally the control system may comprise a processing circuit to determine if alignment of the vehicle is complete.

The control system as described above, wherein the predetermined first distance may be indicated in the request signal. Advantageously, allowing the predetermined first distance to be indicated in the request signal provides further control over the aligning with the first object, allowing a final distance between the vehicle and the first object to be specified.

The control system as described above, wherein, if the first object is sensed to be a predetermined second distance from the vehicle and alignment of the vehicle is not determined to be complete, the control system may be arranged to: stop the vehicle; output another movement signal to cause an application of torque to one or more wheels of the vehicle to move the vehicle in a second direction opposite to the first direction, and turn one or more of the wheels of the vehicle relative to the longitudinal axis of the vehicle to change an angle of the vehicle in relation to the first object; and output the movement signal to move the vehicle in the first direction towards the first object and controlling a direction of one or more wheels of the vehicle relative to the longitudinal axis of the vehicle until the longitudinal axis of the vehicle is in parallel with a surface of the first object. Advantageously, this may aid the vehicle in aligning to the first object in situations where maneuvering space is limited.

Optionally, the predetermined second distance may be equal to or less than the predetermined first distance.

The control system as described above, wherein an object may be detected to be the first object in dependence on displacement of the object from the vehicle, as indicated by the sensor data, being within a predetermined range from the vehicle and in a predetermined directional arc from the vehicle. Advantageously, this may mean the vehicle only aligns to a suitable object, according to it meeting the recited criteria.

The control system as described above, wherein the predetermined directional arc may correspond to an alignment preference indicated in the request signal; and wherein the alignment preference may correspond to a user selection of a direction for the vehicle to align to. Advantageously, greater control over the automatic aligning is provided; for example, a directional arc may be set for an alignment preference such that a vehicle does not attempt to align itself with an object which may be positioned in a direction, relative to the vehicle, which means it would be inappropriate for the vehicle to align to.

The control system as described above, wherein, optionally, one or more of: the request signal may instruct to move the vehicle in the first direction with alignment of the vehicle in dependence on the alignment preference, the first direction being forwards or backwards; the request signal may instruct the vehicle to move a maximum distance of a predetermined number of times the length of the vehicle in the first direction; and the request signal may be used to request the vehicle to move up to a maximum of another predetermined number of times.

The control system as described above, wherein, optionally, one or more of: the request signal may instruct to move the vehicle in the first direction with alignment of the vehicle in dependence on the alignment preference, the first direction being forwards or backwards; the request signal may instruct the vehicle to move a maximum distance of 1.5 times the length of the vehicle in the first direction; and the request signal may be used to request the vehicle to move up to a maximum of four times.

The control system as described above, wherein the control system may be arranged to avoid a detected second object in dependence on the sensor data by maintaining at least a predetermined third distance to the second object while moving the vehicle in the first direction. Advantageously, the presence of the second object does not impede the vehicle aligning with the first object.

The control system as described above, wherein, if the second object is detected to be in a path of the vehicle to the first object, avoiding the second object may comprise outputting the movement signal to control a direction of one or more wheels of the vehicle relative to the longitudinal axis of the vehicle to bypass the second object.

The control system as described above, wherein the control system may be arranged to output the movement signal to move the vehicle in dependence on the request signal if at least one of: it is determined that a device transmitting the request signal is authenticated with the vehicle; it is determined that the vehicle is unlocked and doors of the vehicle are closed; if it determined that a battery level of the vehicle has a predetermined minimum of charge remaining; if it is determined that the vehicle is not connected to an electric power outlet; and if it is determined that the vehicle has at least an amount of fuel remaining to perform the moving of the vehicle in dependence on the request signal. Advantageously, by implementing one or more of these conditions, functionality and security may be improved.

The control system as described above, wherein the control system may be arranged to receive the request signal from a device either internal or external to the vehicle.

According to another aspect of the present invention, there is provided a system comprising: a receiver circuit arranged to wirelessly receive a signal from a mobile device indicative of a user request for vehicle movement and output the request signal in dependence thereon; and any control system as described above, wherein said control system is arranged to receive the request signal.

According to another aspect of the present invention, there is provided a method of controlling movement of a vehicle, the method comprising: receiving a request signal indicative of a request to move the vehicle in a first direction and sensor data indicative of one or more objects in an environment of the vehicle; and controlling an application of torque to one or more wheels of the vehicle to move the vehicle in the first direction in dependence on the request signal and to align the vehicle longitudinally to a detected first object in dependence on the sensor data, the aligned vehicle being positioned at least partly alongside the first object.

The method as described above, wherein an object may be detected to be the first object in dependence on a dimension of the object, as indicated by the sensor data, being equal to or greater than a predetermined value; and wherein controlling an application of torque to one or more wheels of the vehicle to move the vehicle may comprise: controlling a direction of one or more wheels of the vehicle relative to the longitudinal axis of the vehicle to move the vehicle in at least the first direction towards the first object and to align the vehicle with the first object, until the longitudinal axis of the vehicle is in parallel with a surface of the first object.

The method as describe above, wherein the method may be in accordance with any control system described above.

According to another aspect of the present invention, there is provided a vehicle comprising any control system described above, comprising the system as described above, or arranged to perform any method as described above.

According to another aspect of the present invention, there is provided a system comprising a vehicle as described above and a mobile device, wherein the mobile device is configured to wirelessly transmit a signal indicative of a user request for vehicle movement to the vehicle, and the request signal is output in dependence thereon.

The system as described above, wherein the vehicle may be moved in dependence on the request signal if one or more of: the mobile device is within a predetermined fourth distance from the vehicle while the vehicle is moving; a battery of the mobile device has at least predetermined amount of charge remaining; and the mobile device is authenticated with the vehicle. Advantageously, functionality and security may be improved by requiring one or more of these criteria to be met.

The system as described above, wherein an alignment preference may be selected at the mobile device before the signal is transmitted to the vehicle by the mobile device; and wherein an indication of the alignment preference may be included in the request signal.

According to an aspect of the invention, there is provided computer software which, when executed by a processing means, is arranged to perform a method according to an aspect of the invention, such as any method described above. The computer software may be stored on a computer readable medium. The computer software may be tangibly stored on a computer readable medium. The computer readable medium may be non-transitory.

Any controller or controllers described herein may suitably comprise a control unit or computational device having one or more electronic processors. Thus, the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 6A and 68 illustrate movement of a vehicle according to embodiments of the present invention.

DETAILED DESCRIPTION

Figure 1A:
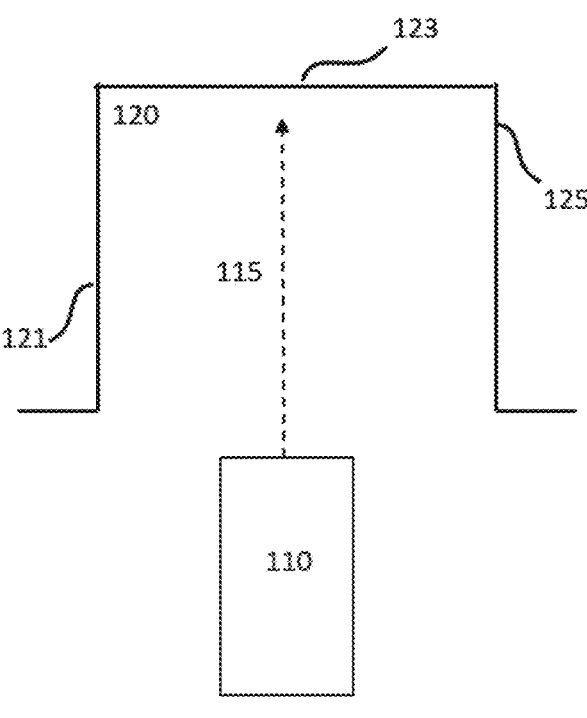
FIGS. 1A and 1B show a vehicle in relation to features in a vicinity of the vehicle.
Figure 1B:
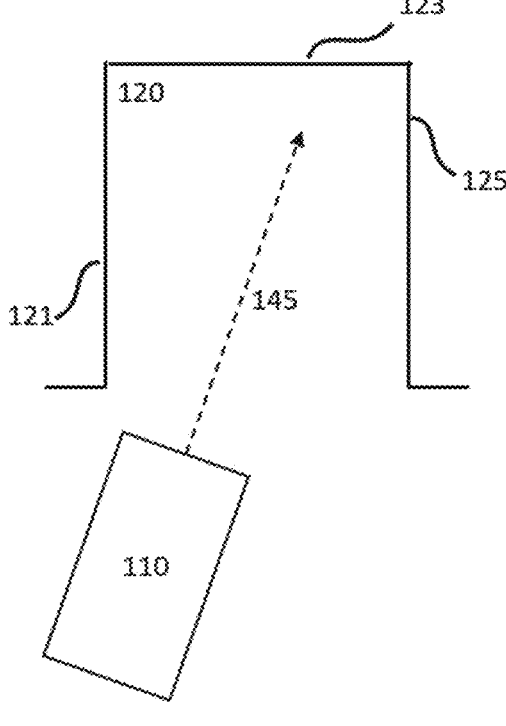

FIGS. 1A and 1B illustrate a vehicle 110 according to an embodiment of the present invention in two different scenarios. FIGS. 1A and 1B illustrates the vehicle 110 prior to performing a defined maneuver in relation to a location, where in this example the location is a parking structure 120, such as a (parking) garage.

In FIG. 1A, the vehicle 110 is initially oriented such that the front (or rear) side of the vehicle is substantially parallel to a feature (e.g., an object). In this example, the feature is the rear wall 123 of the parking structure 120. The parking structure 120 also comprises a first sidewall 121 and a second sidewall 125. The feature is not limited to being the rear wall 123, but could instead be another feature against which the vehicle 110 may contact if it were to move in the direction of arrow 115 without stopping; for example, the feature could be another vehicle or a bollard. In certain embodiments, instead of being a 3-dimensional feature, the feature may be a marked line on the ground (e.g., a line by the side of a road), or other such 2-dimensional feature.

In FIG. 1B, the vehicle 110 is initially oriented at an angle to a feature, which in this example is a rear wall 123 of parking structure 120. Here, it can be seen that the vehicle 110 is also oriented at an angle to the entrance to the parking structure 120. The front (or rear) side of the vehicle 110 is not parallel to the rear wall 123, but the vehicle 110 may still enter the parking structure 120.

It will be understood in both cases shown in FIGS. 1A and B that the defined maneuver may be a maneuver of the vehicle 110 which is performed automatically by the vehicle 110 i.e. under control of one or more systems of the vehicle 110. The defined maneuver may be considered to be performed automatically by the vehicle 110, or at least semi autonomously. A defined maneuver in FIGS. 1A and 1B may be to automatically maneuver the vehicle 110 in a first direction, as indicated by arrows 115 and 145. The first direction may be a forwards direction or a backwards (i.e., reverse) direction. For example, if the first direction is forwards, the vehicle 110 may move such that the front of the vehicle 110 moves towards the rear wall 123 and is nearer to the rear wall 123 than the rear of the vehicle 110, whereas if the first direction is backwards, the vehicle 110 may move such that the rear of the vehicle 110 approaches the rear wall 123 and is nearer to the rear wall that the front of the vehicle 110. It may be advantageous for the maneuver to be performed whilst a person in control of the vehicle 110 is external to the vehicle 110. For example, access to the vehicle 110 may be limited in both FIG. 1A and FIG. 1B after performing the defined maneuver, and so remote controlling of the vehicle 110 means a user does not need to concern themselves with access.

To perform the defined maneuver, the vehicle 110 may comprise environment sensing means (for example, environment sensing means 330 discussed later) for determining a location of objects in a vicinity of the vehicle 110, which may include the first sidewall 121, the second sidewall 125 and the rear wall 123. The environment sensing means may comprise one or more sensing devices or imaging devices. The environment sensing means may output sensor data indicative of a location of one or more objects in an environment of the vehicle 110. The one or more sensing devices may emit radiation and receive radiation reflected from the features in the vicinity of the vehicle, such as ultrasonic sensing devices, radar, lidar etc., although it will be appreciated that the present invention is not limited in this respect. The imaging devices, such as one or more cameras, may receive radiation, such as light, from the one or more features. Such environment sensing means have a minimum distance to which accuracy the location of the features may be determined due to, for example, a resolution of an imaging device or a signal-to-noise ratio of a sensing device. Therefore, a distance at which the vehicle 110 is controlled to stop from the features in the vicinity of the vehicle 110 is determined bearing in mind the minimum distance. This distance may be termed a predetermined second distance, which will be discussed further below. The vehicle 110 would therefore be controlled to stop a distance from the rear wall 123, even if the vehicle 110 is not entirely within the parking structure 120 or location, i.e. the end of the vehicle 110 opposite to that nearest the rear wall 123 may protrude from the entrance of the parking structure 120. Similarly, the vehicle 110 would be controlled to stop a distance from the first sidewall 121 or the second sidewall 125, even if the vehicle 110 is not entirely within the parking structure 120 or location.

Accordingly, referring to FIGS. 1A and 1B, it can be seen that if the vehicle 110 simply moves in the direction of the arrow, the vehicle 110 will end/complete the defined maneuver positioned near the centre of the parking structure 120 a distance from the rear wall 123 and facing the rear wall 123, as would be the case in FIG. 1A, or angled across the parking structure 120 a distance from the rear wall 123, as would be the case in FIG. 1B. As such, the final position of the vehicle 110 may result in an inefficient use of space in the parking structure 110.

For example, if the parking structure 110 is intended to simultaneously enclose another vehicle, vehicle 110 being positioned inefficiently may prevent the other vehicle from maneuvering into the parking structure 120. Vehicle 110 may then need to be repositioned (either manually or through performance of one or more additional defined maneuvers), causing frustration. In another example, if vehicle 110 is at an angle to the rear wall 123, the vehicle 110 may not be fully enclosed within the parking structure 120 due to an insufficient length of the parking structure compared to a diagonal length of vehicle 110. A door of the parking structure 120 (not shown) may then be unable to close unless vehicle 110 is repositioned (either manually or through performance of one or more additional defined maneuvers), causing frustration. Embodiments of the present invention aim to ameliorate one or more of these problems.

Figure 2:
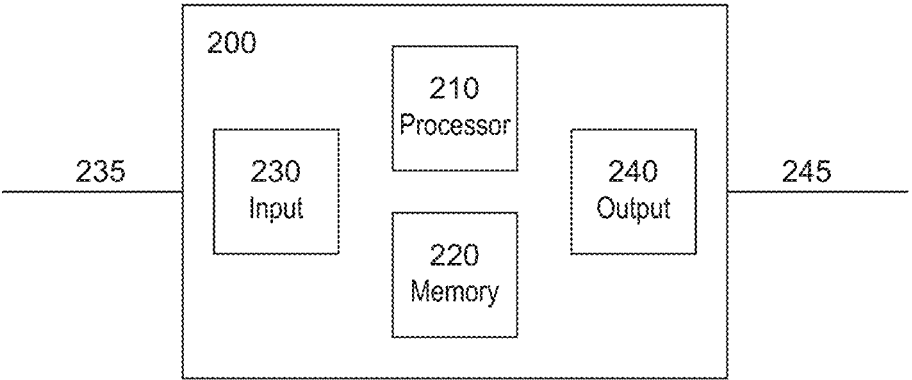
FIG. 2 shows a controller according to an embodiment of the present invention.
Figure 7:
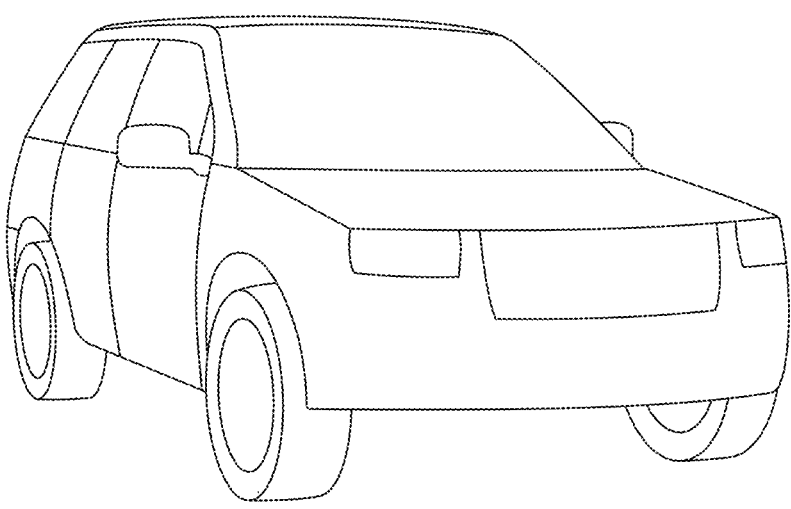
FIG. 7 shows a vehicle in accordance with an embodiment of the invention.

FIG. 2 illustrates a controller 200 (or control unit) such as may be included in a control system according to an embodiment of the present invention. In certain embodiments, the control system may comprise at least one controller 200. It will be appreciated that, where it is described herein that the control system may be arranged to or configured to perform some feature or function, this may be interpreted to mean that a component of the control system, such as controller 200 (or a component of controller 200 such as control means 210), may be arranged to perform said feature or function. In certain embodiments, the control system may be included in a vehicle 110. FIG. 7 illustrates an example of a vehicle 110 in accordance with embodiments of the present invention.

The controller 200 comprises a control means 210, input means 230 and output means 240. In some embodiments the controller 200 comprises a memory means 220 such as one or more memory devices for storing data therein.

The input means 230 may comprise an input unit and/or input circuit. The input means 230 may comprise an electrical input for receiving a request signal 235. The request signal 235 may be wirelessly received. The request signal 235 may be wirelessly received from a user device. The request signal 235 is indicative of a request to move the vehicle 110 in a first direction (such as a user request for vehicle movement of the vehicle 110 in a first direction), as will be explained. The input means 230 may comprise an electrical input for receiving sensor data indicative of one or more objects in an environment of the vehicle 110. The sensor data may be received from an environment sensing means included in the vehicle 110, as described above. In certain embodiments, the input means 230 comprises an input circuit arranged to receive the request signal 235 and the sensor data.

The output means 240 may comprise an output unit and/or output circuit. The output means 240 may comprise an electrical output for outputting a movement signal 245. The movement signal 245 represents an instruction for the vehicle 110 to move a predetermined distance. The instruction provided by the movement signal 245 is provided to cause the vehicle 110 to move in a longitudinal axis of the vehicle 110, i.e. generally forwards or backwards. In certain embodiments, the output means 240 comprises an output circuit arranged to output the movement signal (245).

In some embodiments the input means 230 and output means 240 may be combined such as by being formed by an I/O unit or interface unit. For example, the controller 200 may comprise an interface to a network forming a communication bus of a vehicle. The interface bus may be an Internet Protocol (IP) based communication bus such as Ethernet, or another bus such as CANBus, Flexray etc. although embodiments of the invention are not limited in this respect.

The control means 210 may be formed by one or more electronic processing devices such as an electronic processor. The processor may operably execute computer readable instructions stored in the one or more memory devices (i.e., the memory means 220). In certain embodiments, the control means 210 comprises a control circuit arranged to control at least one of the input means 230 (e.g., the input circuit) and the output means 240 (e.g., the output circuit). The control means 210 is arranged to control the output means 240 to output the movement signal 245 in dependence on the request signal 235 and/or the sensor data.

In certain embodiments, the control means 210 is arranged to control the output means 240 to output the movement signal 245 to cause an application of torque to one or more wheels of the vehicle 110 to move the vehicle 110 in a first direction in dependence on the request signal 235 and to align the vehicle 110 longitudinally to a detected first object in dependence on the sensor data, where the aligned vehicle is positioned at least partly alongside the first object. It will be appreciated that this may be interpreted to mean, in certain embodiments of the present disclosure, that the controller 200 may output the movement signal 245 to a motive control means 320 to control the application of torque to one or more wheels of the vehicle 110 to move the vehicle 110, as discussed below.

In certain embodiments, the movement in the first direction may be considered a defined maneuver which the vehicle 110 is instructed to perform by a user, as indicated by the request signal 235. For example, a user may request the vehicle 110 to move forward or backwards by a predetermined distance. The user request (or request signal 235) may also indicate an alignment preference for the vehicle 110 in performing the movement in the first direction (i.e., in performing the defined maneuver). In certain embodiments, the alignment preference may be considered to be a part of the defined maneuver itself; i.e., the defined maneuver may be said to be a movement in the first direction with a predetermined/preset alignment preference. In other embodiment, the alignment preference may be considered as additional to the defined maneuver; for example, an instruction relating to how the vehicle 110 is to perform the defined maneuver. This may be in consideration of the alignment not taking place if a feature (or object) to align to is not detected, in which case the vehicle 110 would just move in the first direction as instructed.

Figure 3:
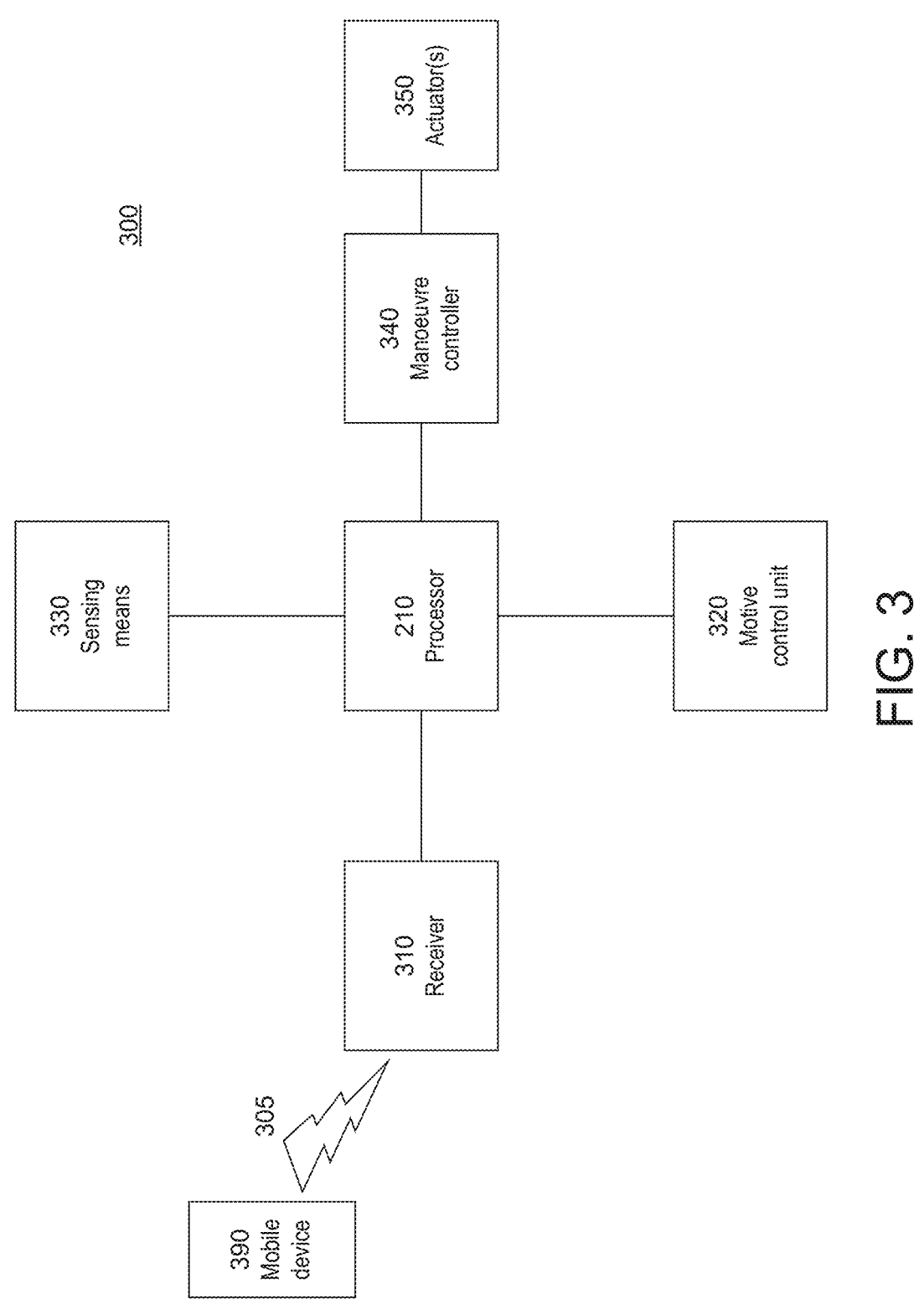
FIG. 3 shows a system according to an embodiment of the present invention.

FIG. 3 illustrates a system 300 according to an embodiment of the invention. In certain embodiments, the system 300 comprises the control system described above. For example, the system 300 may comprise a control system comprising the controller 200 described above and shown in FIG. 2.

The system 300 comprises a receiver means 310 for wirelessly receiving a signal 305. The signal 305 may be received from a mobile device 390 associated with a person responsible for the vehicle 110. The signal 305 may be indicative of a request signal 235 of a request to move the vehicle 110 in a first direction, as noted above. The receiver means 310 may be arranged to output the signal 305 (or the request signal 235) to the input means 230 of the controller 200 as described above. The signal 305 (or the request signal 235) may be output by the receiver means 310 onto a communication bus of the vehicle 110 which may communicably couple the components of the system 300.

Certain embodiments of the present invention include the mobile device 390 in isolation of the other parts of system 300. For example, an embodiment of the present invention relates to a mobile device 390 providing a GUI as will be discussed below in relation to FIGS. 4A and 4B. Yet other embodiments of the present invention include the system 300 with mobile device 390 omitted. For example, an embodiment of the present invention relates only to the parts of system 300 provided in vehicle 110.

The receiver means 310 may be in the form of a radio unit 310 or other communication unit 310. The radio unit 310 may comprise a receiver for receiving radio signals 305 from the mobile device 390. In some embodiments the radio unit 310 may also comprise a transmitter, or may be a transceiver 310 configured to receive radio signals 305 transmitted from the mobile device 390 and transmit signals to the mobile device 390. The radio unit 103 and the mobile device 390 may be arranged to provide a wireless local area network, via which two-way communication may take place between the radio unit 310 and the mobile device 390. For example, the radio unit 310 may be arranged to communicate by WiFi (RTM) with the mobile device 390. In alternative embodiments other radio communication standards may be used for the communication. For example, communication between the radio unit 103 and the mobile device 390 is provided via Bluetooth®, ZigBee, WiFi Direct, or another point-to-point radio mechanism; however, other protocols or standards may be implemented—for example, communication may be provided by LTE, 5G-NR, W-Fi etc.

The mobile device 390 may be an electronic key fob associated with the vehicle 110, such as may be used to gain entry and to activate or power up the vehicle 110. The mobile device 390 may, in other embodiments, be an electronic device associated with the person responsible for the vehicle 110 such as a mobile telephone, tablet, watch, wearable electronic device or other computing device associated with the person. The mobile device 390 is capable of receiving a user input indicating the person's desire to move the vehicle 110. The user input may be provided in the form of a button or key press, activation of a graphically displayed icon, a gesture or voice command. Other forms of user input may also be envisaged.

The system 300 comprises a motive control means 320. The motive control means may be a motive control unit 320. The motive control means 320 is arranged to receive the movement signal (245) output by the controller 200. The motive control means 320 is associated with one or more motive units of the vehicle 110 which may form part of a powertrain (not shown) of the vehicle 110. The motive units may comprise one or more of an internal combustion engine and one or more electric machines of the vehicle 110. The powertrain is arranged to provide power, or traction torque, to cause movement in the longitudinal axis of the vehicle 110 i.e. forward or backward movement of the vehicle 110 in dependence on the movement signal (245) received from the controller 200.

The motive control means 320 is arranged to control the application of traction torque to one or more wheels of the vehicle 110 to move the vehicle 110 in the first direction in dependence on the request signal 235 (i.e. to move the predetermined distance generally forwards or backwards) and to align the vehicle 110 longitudinally to a detected first object in dependence on the sensor data as will be explained. The torque may comprise driving torque i.e. applied in a direction of desired movement, such as forwards. The torque may also comprise braking torque i.e. applied to resist the driving torque. In some embodiments both driving torque and braking torque may be applied simultaneously in order to provide low-speed movement of the vehicle 110. The braking torque may also be applied at least partly after the driving torque in order to effect accurate movement of the vehicle 110.

The system 300 comprises environment sensing means 330 for determining information about an environment of the vehicle 110. In particular, the environment sensing means 330 is provided for determining a location of one or more features (or objects) in a vicinity of the vehicle 110. The environment sensing means 330 is arranged to output an environment signal indicative of the determined features. In an embodiment, the environment signal may be output to the input means 230 of the controller 200. The environment signal may be sensor data (or environment data) which may be stored in a memory. The environment sensing means may comprise one or more sensing devices such as imaging devices, such as cameras, or other sensing devices such as radar, LIDAR, ultrasonic devices, sonar devices etc. Signals output by each of the sensing devices may be used to form a representation of the environment of the vehicle 110 which is stored in the memory for use by other systems of the vehicle 110. The environment sensing means 330 may be arranged to determine a location of features such as walls, posts or other vehicles in relation to which the vehicle 110 is required to maneuver. As noted above, a minimum distance (i.e., the predetermined second distance) may be predetermined as the shortest distance which the vehicle should maneuver from such features. The minimum distance may be, for example 0.3 m although it will be realized that this minimum distance is only provided as an example. The minimum distance may be predetermined bearing in mind a type and sensitivity of the environment sensing means 330.

The sensor data may indicate one or more objects in the vicinity of the vehicle 110. In certain embodiments, the sensor data may indicate only one or more objects which meet one or more predetermined criteria. For example, the environment sensing means 330 may only output sensor data indicative of one or more objects in the environment of the vehicle 110 which are at least a predetermined height, and/or at least a predetermined length (i.e., at least a predetermined size in one dimension other than height), and/or at least a predetermined size in a direction substantially parallel to the longitudinal axis of the vehicle 110. In another embodiment, the environment sensing means 330 may output sensor data indicative of one or more objects in the environment of the vehicle 110, and the controller 200 may determine whether the one or more objects meet one or more predetermined criteria (such as given above).

The system 300 comprises defined maneuver means 340. The defined maneuver means is arranged to control the vehicle 110 to perform at least one defined maneuver. The defined maneuver means 340 may comprise a defined maneuver controller for controlling one or more systems of the vehicle 110 to perform one or more defined maneuvers. The defined maneuver means 340 may be associated with one or more actuators 350 of the vehicle 110. The one or more actuators 350 are provided for effecting movement of the vehicle 110. The actuators may comprise one or more of a power steering mechanism arranged to provide steering of wheels of the vehicle 110 in dependence on signals received from the defined maneuver means 340. A second actuator may, in some embodiments, comprise a powered braking mechanism of the vehicle 110 which is arranged to actuate brakes of the vehicle in dependence on signals received from the defined maneuver means 340. It will be appreciated that in other embodiments, braking may be applied by an electric machine being operated as a generator. A third actuator comprises the powertrain of the vehicle described above. To achieve control of the powertrain the defined maneuver means 340 may communicate with the motive control means 320. Thus, the one or more actuators 350 can control a direction and movement of the vehicle to perform the defined maneuver. The defined maneuver may be performed in dependence on the environment signal provided by the environment sensing means 330 and/or on the request signal 235 provided by the receiver means 310.

In certain embodiments, a defined maneuver may be a maneuver in the first direction with an alignment preference. For example, a defined maneuver may be a maneuver in a forwards direction with alignment to the left, wherein the vehicle 110 is controlled to move in a forward direction and, upon detecting an object in the vicinity of the vehicle 110, to move towards the object so as to position the vehicle 110 alongside the object, at a predetermined first distance away from the object, and longitudinally aligned with the object. In another example, a defined maneuver may be a maneuver in a backwards direction with alignment to the right, wherein the vehicle 110 is controlled to move in a reverse direction and, upon detecting an object in the vicinity of the vehicle 110, to move towards the object so as to position the vehicle 110 alongside the object, at a predetermined first distance away from the object, and longitudinally aligned with the object.

In certain embodiments, the controller 200 (or, for example, control means 210 of controller 200) is arranged to control the vehicle 110 such that, when performing a defined maneuver when an alignment preference is set, the vehicle moves to align with a detected object according to the alignment preference. The defined maneuver may be a movement of the vehicle 110 in a first direction. The controller 200 may, in certain embodiments, receive the sensor data to detect an object to align to according to the alignment preference. For example, if the alignment preference is set to the left side of the vehicle 110, the controller 200 may process the sensor data to identify, or detect, whether there is an object to align a left side of the vehicle 110 to in the environment of the vehicle 110. For example, if a left alignment preference is set and the first direction is forwards, the controller 200 may not control the vehicle to align to an object behind the vehicle 110 or to the right of the vehicle 110.

In certain embodiments, the alignment preference (or the request signal 235) may include an indication (or a setting) of a proximity to the detected object. This may correspond to a distance from the detected object which the vehicle 110 is to position itself when aligning with the detected object. That is, for the vehicle 110 to consider alignment to be complete, the vehicle 110 will be equal to, or within, the indicated proximity. It will be appreciated that the proximity indicated in the alignment preference may therefore correspond to the predetermined first distance discussed herein. In certain embodiments, a user may specify the proximity when selecting the direction of the alignment preference (e.g., left, right, centre); or, the proximity may be set in advance (e.g., a default proximity may be set). In certain embodiments, the proximity may be indicated in terms of 'loose', 'normal' and 'tight'; corresponding to distances for different, preset proximities. In other embodiments, the proximity may be indicated by a numerical value which represents a distance; for example, 10 cm, 15 cm, 20 cm etc.

In certain embodiments, the controller 200 will control the vehicle 110 to only align to an object according to the alignment preference if the object meets one or more predetermined criteria. That is, for said object to be regarded as the first object, said object must meet one or more requirements. For example, as well as being located relative to the vehicle 110 in accordance with the alignment preference, the object may be required to have a length greater than a first value and a height greater than a second value.

Figures 4A, 4B:
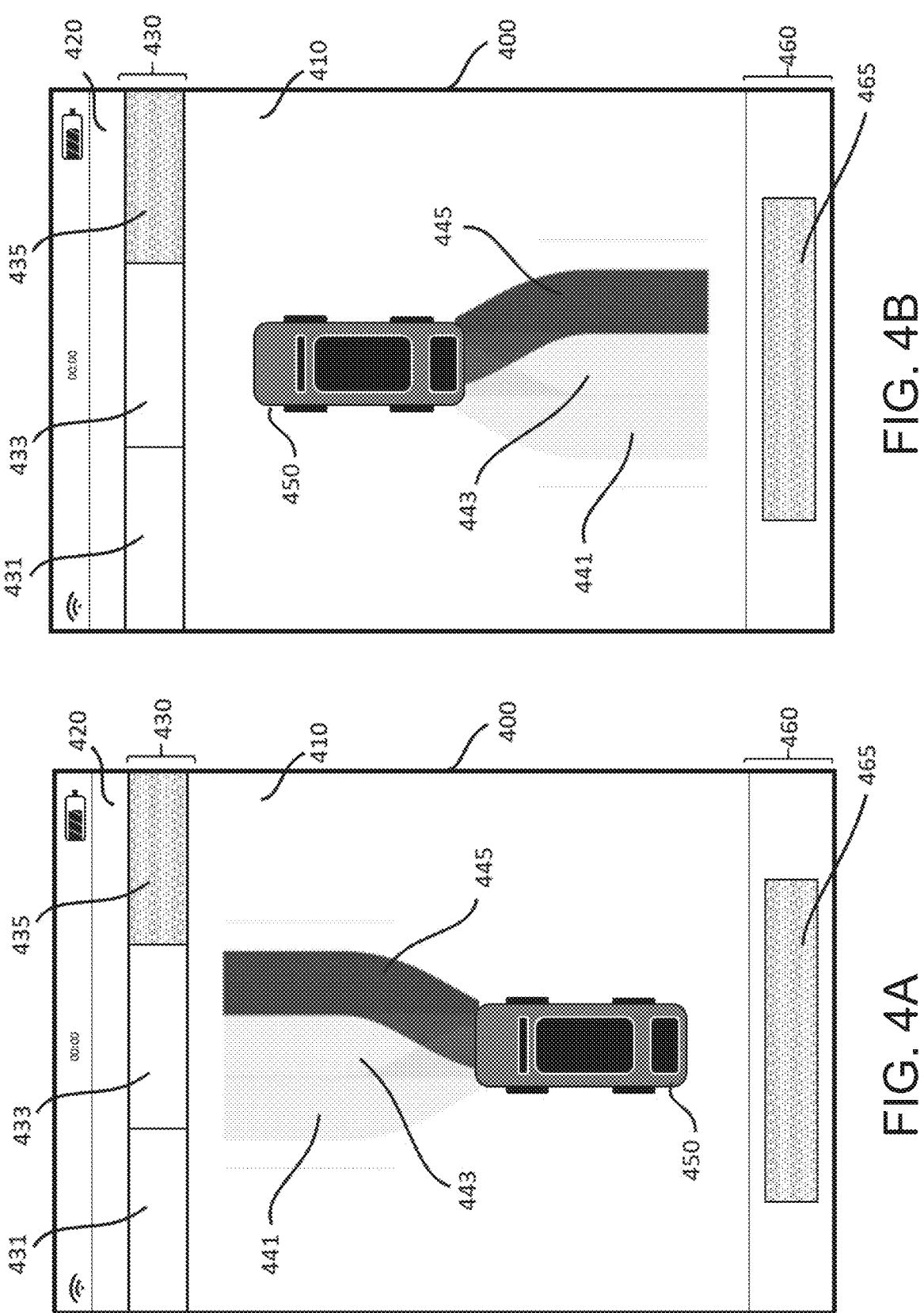
FIGS. 4A and 4B show a graphical user interface, GUI, according to embodiments of the present invention.

In certain embodiments, the alignment preference may be indicated in the request signal 235. For example, the user may specify the alignment preference at the time of selecting a defined maneuver for the vehicle 110 to perform, such as via a button, voice command, GUI or application provided by mobile device 390. FIGS. 4A and 4B show an example method by which an alignment preference may be selected.

FIGS. 4A and 4B show example of a graphical user interfaces, GUIs 410, that may be displayed on a display means 400 (for example, a display unit) of mobile device 390, through which a user of the mobile device 390 may select an alignment preference for the vehicle 110 while performing a defined maneuver. It will be appreciated that GUI 410 may be displayed as part of computer software (e.g., an application) executed by a processor of the mobile device 390. GUI 410 may provide access to various different operations and functionality in addition to allowing for selection of an alignment preference. For example, GUI 410 may also allow for the selection of a defined maneuver for the vehicle 110 to perform.

In FIG. 4A, GUI 410 illustrates a defined maneuver of movement in a forwards direction by the vehicle 110 (i.e., the first direction is forwards). In FIG. 4B, GUI 410 illustrates a defined maneuver of movement in a backwards direction by the vehicle 110 (i.e., the first direction is reverse/backwards). GUI 410 may be displayed on a screen or display unit of the mobile device 390, for example on a touch screen. As will be discussed below, GUI 410 may comprise a number of different elements, both selectable and non-selectable.

GUI 410 may include a first region 420 which may include information such as text. The text may indicate a current screen or menu within GUI 410. For example, in view of the GUI 410 displaying a screen which allows for selection of an alignment preference, the first region 420 may include the text "SIDE PREFERENCE" or "ALIGNMENT SELECTION" or the like. This informs a user of the purpose of the screen of GUI 410. It will be appreciated that the location of the first region 420 in GUI 410 may be different to that shown in FIGS. 4A and 4B; the first region 420, if displayed, is not limited to being shown at the top of GUI 410.

GUI 410 may include a second region 430 for selecting an alignment preference. The second region 430 may include one or more selectable items 431, 433, 435 which allow for a user to select an alignment preference. It will be appreciated that the second region may be located anywhere within the screen of GUI 410 or even in a separate screen. Alternatively, the options or items within the second region 430 could be displayed by some other means, such as being provided through a drop-down list. In another alternative, the second region 430 may be omitted and instead an alignment preference is selected by selecting one of alignment indicators 441, 443, 445, which will be discussed further below.

The illustrated second region 430 includes three items 431, 433, 435; however, it will be appreciated that more or fewer items could be included in the second region 430.

Each item 431, 433, 435 may be selectable, for example through a touch input or corresponding button on mobile device 390, such that a user may select an alignment preference. In an embodiment, item 431 corresponds to a left alignment preference, item 433 corresponds to a centre alignment preference (indicating that vehicle 110 should align between two detected objects, for example, to be the same distance from each object or a specified distance from one object and another specified distance from another object), and item 435 corresponds to a right alignment preference. In certain embodiments, an indication may be provided in GUI 410 as to which alignment preference each item 431, 433, 435 corresponds to. For example, the text "LEFT" may be displayed associated with item 431 (e.g., within or around item 431), the text "CENTRE" may be displayed associated with item 433 (e.g., within or around item 433), and the text "RIGHT" may be displayed associated with item 435 (e.g., within or around item 435).

In FIG. 4A and FIG. 4B, item 435 is shown to be selected through the shading applied to this item, and therefore a right alignment preference is selected. It will be appreciated that a different alignment preference may be set simply by selecting one of items 431 or 433.

GUI 410 includes one or more indicators 441, 443, 445 for indicating a selected alignment preference. In certain embodiments, the one or more indicators 441, 443, 445 may also be selectable, such that an indicator may be selected to set the alignment preference—in such cases, second region 430 may not also be provided.

Each of the one or more indicators 441, 443, 445 may correspond to a different alignment preference. For example, each indicator may correspond to the alignment preference associated with an item in the second region 430 (if the second region 430 is provided in GUI 410). In GUI 410, indicator 441 corresponds to a left alignment preference, indicator 443 corresponds to a centre alignment preference, and indicator 445 corresponds to a right alignment preference. In GUI 410, the indicators 441, 443, 445 are given an appearance illustrative of a path of the defined maneuver with the corresponding alignment preference. However, it will be appreciated that the indicators 441, 443, 445 may have any form suitable for indicating a selected alignment preference. Furthermore, in certain embodiments a single indicator is provided, which indicates a selected alignment preference (such as may have been selected through the second region 430).

Consistent with item 435 being shown to be selected in FIGS. 4A and 4B, indicator 445 is shown highlighted so as to indicate that a right alignment preference has been selected. For FIG. 4A, this right alignment preference is set for a first direction being a forwards direction; while in FIG. 4B, this right alignment preference is set for a first direction being a backwards direction. In an embodiment, a selection of an indicator 441, 443, 445 may cause highlighting of the selected indicator 441, 443, 445, thereby indicator the corresponding alignment preference has been set.

GUI 410 may include a vehicle representation 450. The vehicle representation 450 may correspond to a make, model, type etc. of the vehicle 110 which will be instructed to perform the defined maneuver with alignment preference, or may be a generic vehicle representation. As shown in GUI 410, the one or more indictors 441, 443, 445 may be displayed in combination with the vehicle representation 450 so as to illustrate a general path of the defined maneuver with selected alignment preference, thereby informing the user of their selection.

In FIG. 4A, the defined maneuver is a movement of the vehicle 110 in a forwards direction, and so the one or more indicators 441, 443, 445 are positioned from the front of the vehicle representation 450 to illustrate a potential movement path of the vehicle 110 for the defined maneuver with each alignment preference. In FIG. 4B, the defined maneuver is a movement of the vehicle 110 in a reverse direction, and so the one or more indicators 441, 443, 445 are positioned from the rear of the vehicle representation 450 to illustrate a potential movement path of the vehicle 110 for the defined maneuver with each alignment preference.

GUI 410 may include a third region 460 for providing one or more selectable items 465. It will be appreciated that the location of the third region 460 in GUI 410 may be different to that shown in FIGS. 4A and 4B; the third region 460, if displayed, is not limited to being shown at the bottom of GUI 410. The third region 460 may include an item 465 for confirming the selection of alignment preference. In an embodiment, if this item 465 is selected (for example, by a touch input) GUI 410 may display a different screen in view of the user having confirmed their selection of alignment preference. The different screen may, for example, be a screen for confirming performing of the defined maneuver with alignment preference, where a user may provide a specific input to cause instruction of the vehicle 110 to perform the defined maneuver. For example, the different screen may be associated with transmitting a request signal 235 indicative of a request to move the vehicle in a first direction with a selected alignment preference.

In another embodiment, the third region 460 may include an item 465 for cancelling a selection of an alignment preference. If this item 465 is selected, for example, the one or more indicators 441, 443, 445 may all be displayed without highlighting, and the one or more items may all be displayed without one indicating as having been selected. Alternatively, or additionally, selection of this item 465 for cancelling the selection may result in GUI 410 displaying a different screen; such as a screen for selecting a defined maneuver or a screen for confirming performing of the defined maneuver (without alignment preference).

As discussed above, in certain embodiments the controller 200 may be arranged to output a movement signal (245) to cause an application of torque to one or more wheels of the vehicle 110 in the first direction in dependence on the request signal 235 and to align the vehicle longitudinally to a detected first object in dependence on the sensor data, the aligned vehicle being positioned at least partly alongside the first object.

Figure 5:
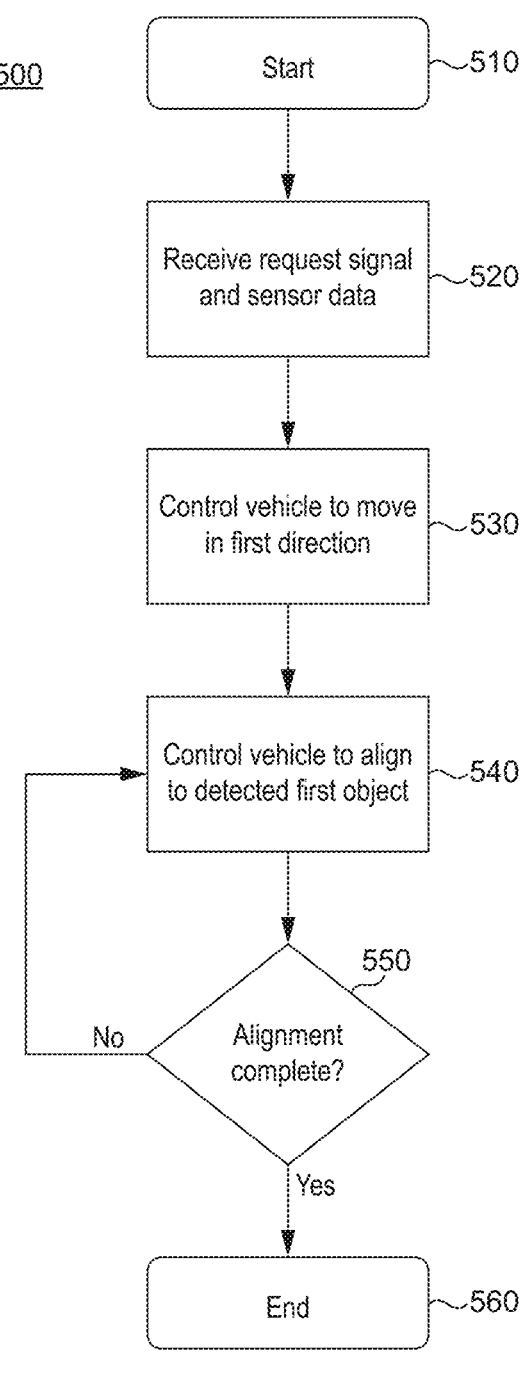
FIG. 5 shows a method according to an embodiment of the present invention.

FIG. 5 illustrates a method 500 according to an embodiment of the invention. The method 500 is a method of controlling movement of the vehicle 110. The method 500 may be performed by the controller 200 and/or system 300 described above with reference to FIGS. 2 and 3.

The different boxes in FIG. 5 may be labelled as follows:
510: "Start".
520: "Receive request signal and sensor data".
530: "Control vehicle to move in first direction".
540: "Control vehicle to align to detected first object".
550: "Alignment complete?"
560: "End".

As shown, a positive outcome for 550 ("Yes") may result in 560 of method 500, while a negative outcome for 550 ("No") may result in returning to 540 of method 500.

The method 500 generally comprises operations of receiving 520 a request signal 235 indicative of a request to move the vehicle 110 in a first direction and receiving 520 sensor data indicative of one or more objects in an environment of the vehicle 110; and output a movement signal 245 to cause an application of torque to one or more wheels of the vehicle 110 to move 530 the vehicle 110 in the first direction in dependence on the request signal 235 and to align 540 the vehicle 110 longitudinally to a detected first object in dependence on the sensor data, the aligned vehicle 110 being positioned at least partly alongside the first object.

The method 500 may also comprise an operation of determining 550 whether alignment of the vehicle 110 to the detected first object is complete: if so, the method 500 ends at 560; if not, the method 500 returns to 540 to continue aligning the vehicle 110 to the first object. One or more embodiments of the present invention may include additional or alternative operations or features to this general method 500, as will be seen below.

Referring to 520, the method 500 comprises an operation of receiving a request signal 235 indicative of a request to move the vehicle 110 in a first direction and sensor data indicative of one or more objects in an environment of the vehicle 110.

In certain embodiments, 520 may be considered two separate operations: one in which the request signal 235 is received and one in which the sensor data is received. Here, the operations may occur in either order. It will be appreciated that, in certain embodiments, the receiving of sensor data may occur continuously; for example, the environment sensing means 330 may periodically monitor and/or continuously receive data on the environment of the vehicle 110 (via one or more sensing means, for example), and so the received sensor data of 520 may be a part of this data.

In certain embodiments, the request signal 235 may be received from a mobile device 390 (e.g., a device external to the vehicle 110). In other embodiments, the request signal 235 may be received from a device internal to the vehicle 110, such as through a device provided by/in the vehicle 110 itself. For example, a touch screen may be provided on a vehicle 110 console/dashboard and may display a GUI which allows a user to select a defined maneuver (and, optionally, allowing selection of an alignment preference, for example through a GUI such as described in FIGS. 4A and 4B) for the vehicle 110 to perform, while the user is in the vehicle 110. This GUI may be provided under control of a controller within the vehicle 110, such as controller 200.

The request signal 235 is indicative of a request to move the vehicle 110 in a first direction. For example, the request signal 235 may relate to a defined maneuver to be performed by the vehicle 110 as selected by a user of mobile device 390 or a user of the device provided in/by the vehicle 110, where the defined maneuver is in a first direction being a substantially forwards direction or substantially backwards direction (i.e., reverse) for the vehicle 110.

In certain embodiments, the request signal 235 may also include an indication of an alignment preference. This indication may be for the movement in the first direction (i.e., the defined maneuver). For example, the user of the mobile device 390 may select the alignment preference, such as through a method as outlined in FIGS. 4A and B. However, in other embodiments, the alignment preference may be preset at the mobile device 390 or at the vehicle 110, such that a user selection of the alignment preference may not be necessary. For example, in consideration of a typical defined maneuver (such as moving the vehicle 110 forwards into a parking garage), an alignment preference may be preset in the mobile device 390 or the vehicle 110 so that a user does not have to re-select the alignment preference each time they want the vehicle 110 to perform this defined maneuver.

In certain embodiments, the request signal 235 may also include an indication of a proximity, where, in aligning the vehicle 110 with the detected first object, the vehicle 110 moves to a distance within (or equal to) the indicated proximity of the detected first object.

Referring to 530, the method 500 comprises an operation of outputting a movement signal 245 to cause an application of torque to one or more wheels of the vehicle 110 to move the vehicle 110 in the first direction in dependence on the request signal 235. This operation may be combined with 540 which is discussed further below (resulting in a combined operation of 530 and 540) or may be regarded as separate (and, optionally, performed at the same time as 540).

Here, moving the vehicle 110 in the first direction may refer to the vehicle 110 moving forwards or backwards; i.e., the wheels of the vehicle 110 rotating in a direction which causes the vehicle 110 to travel forwards or in a direction which causes the vehicle 110 to travel backwards. It will be appreciated that, during this movement, a direction of one or more wheels of the vehicle 110 may also be controlled relative to the longitudinal axis of the vehicle 110 so as to steer the vehicle 110—this will be discussed further in relation to 540. This controlling of the direction of one or more wheels of the vehicle 110 so as to steer or direct the vehicle 110 may combine with the moving of the vehicle 110 in the first direction, so that, for instance, the vehicle 110 changes course while moving forwards or backwards. In certain embodiments, the vehicle 110 only moves in the first direction in 530 with no change of direction of one or more wheels; this may correspond to a time before the vehicle 110 initiates alignment with a detected first object (for example, before a suitable object to align to has been detected).

Referring to 540, the method 500 comprises aligning the vehicle 110 longitudinally to a detected first object in dependence on the sensor data. In certain embodiments, following alignment, the aligned vehicle 110 is positioned at least partly alongside the detected first object. As mentioned above, although shown separate to 530, in certain embodiments of the present invention 530 and 540 may be considered as a single operation in which the controller 200 controls the vehicle 110 to move in the first direction in dependence on the request signal 235 and to align to the detected first object in dependent on the sensor data.

In certain embodiments, the detected first object is an object, indicated in the sensor data, which is located within a predetermined directional arc from the vehicle 110, where the predetermined directional arc corresponds to the alignment preference and/or the first direction. For example, an alignment preference may correspond to a predetermined directional arc which ensures that an object on an opposite side of the vehicle 110 to a side indicated by the alignment preference will not be detected as the first object; such that the vehicle 110 will not align to such an object. In certain embodiments, an object is additionally or alternatively detected to be the first object in dependence on displacement of the object from the vehicle 110, as indicated by the sensor data, being within a predetermined range from the vehicle 110. In other words, the vehicle 110 may not align to an object which is outside a predetermined range from the vehicle 110, even if the object is indicated in the sensor data.

In certain embodiments, the request signal 235 may instruct to move the vehicle 110 in the first direction with alignment of the vehicle 110 in dependence on the alignment preference (e.g., on a corresponding predetermined directional arc), where the first direction may be forwards or backwards as discussed above; and/or the request signal 235 may instruct the vehicle 110 to move a maximum distance of a predetermined number of times (for example, 1.5 times) the length of the vehicle 110 in the first direction; and/or the request signal 235 may be used to request the vehicle 110 to move up to a maximum of another predetermined number of times (for example, four times). This maximum distance and the specified maximum number of times that the request signal 235 may be used to move the vehicle 110 may correspond to safety standards and/or manufacturer settings.

The first object may be detected at the time at which movement of the vehicle 110 in the first direction is initiated or after the vehicle 110 has travelled a distance in the first direction. For example, at the time the movement begins, the sensor data may not indicate any object which corresponds to the alignment preference; e.g., sensor data may not indicate any valid object to align with, with no object meeting the criteria to be detected/determined as the first object. However, after the vehicle 110 has moved in the first direction for a time or a distance, sensor data may indicate an object which is detected as the first object. The vehicle 110 may then be controlled to align to the detected first object.

In certain embodiments, the detected first object may be an object, indicated in the sensor data, which meets one or more predetermined criteria. For example, an object is detected to be the first object in dependence on one or more dimensions of the object, as indicated by the sensor data, being equal to or greater than one or more predetermined values (that is, a corresponding predetermined value for each dimension). In certain embodiments, the one or more dimensions of the object may include a length of a surface of the object, and the predetermined value is set in dependence on a length associated with the vehicle 110. Optionally, the length associated with the vehicle 110 may correspond to the longitudinal length of the vehicle 110.

For example, to be detected as the first object, an object may be required to have a surface (or side) facing (i.e., being towards) the vehicle 110 having a length which is greater than or equal to a predetermined first value set based on the longitudinal length of the vehicle 110. To give an example, the predetermined first value may be set as one half, one third or one quarter of the length of the vehicle 110.

In another example, an object may be required to have a height which is equal to or greater than a predetermined second value. The predetermined second value may be set in dependence on a height of the vehicle 110 or may be set independently. For example, the predetermined second value may be set as an arbitrary figure such as 20 cm, requiring the first object to have at least this height, or may be set based on the minimum height of ground clearance for a vehicle (such as vehicle 110), or may be set to be greater than or equal to one half, one third or one quarter of the height of the vehicle 110.

It will be appreciated that the one or more dimensions may include both length of the object and the height of the object. That is, in certain embodiments, an object is detected as the first object if it has a length which is greater than or equal to a predetermined first value which is set in dependence on a length associated with the vehicle, and it has a height which is greater than or equal to a predetermined second value which is set in dependence on a height associated with the vehicle.

The first object may additionally or alternatively be termed an alignment object, or an object of interest, or an object to align to, or similar. Further, the first object may have been determined to be a candidate first object from the sensor data; being an object which meets the criteria for being regarded as an object to which the vehicle 110 may align to. For example, the sensor data may indicate one or more objects which meet the criteria for being regarded as a first object, and these one or more objects may be regarded as candidate first objects. A first object among the candidate first objects may be determined for the vehicle 110 to align to. in dependence on one or more factors such as a location of each candidate first object relative to the vehicle, a size of at least one dimension of each candidate first object, a type of each candidate first object, etc.

Therefore, in certain embodiments, the controller 200 may determine a first object indicated in the sensor data for the vehicle 110 to align to in dependence on the alignment preference, where the first object is at least one of: is within a predetermined range from the vehicle 110, has a side/surface facing the vehicle with a length equal to or greater than a predetermined first value, has a height which is equal to or greater than a predetermined second value, and/or is located within a predetermined directional arc from the vehicle 110.

In certain embodiments, to align the vehicle 110 longitudinally to the detected first object, the movement signal 245 may be output to control a direction of one or more wheels of the vehicle 110 relative to the longitudinal axis of the vehicle 110 to move the vehicle 110 in the first direction towards the first object and to align the vehicle 110 with the first object. For example, controlling the direction of one or more wheels of the vehicle 110 may comprises controlling the direction of one or more wheels of the vehicle 110 relative to the longitudinal axis of the vehicle 110 to angle towards the first object or to angle away from the first object.

For example, aligning the vehicle 110 with the detected first object may include moving the vehicle 110 to within a predetermined first distance of the first object. As discussed above, in certain embodiments the predetermined first distance may correspond to an indication of a proximity included in the request signal 235, where a user may have specified the proximity. If the vehicle 110 is outside of (i.e., farther than) the predetermined first distance from the first object, the vehicle 110 will be controlled to move closer to the first object by controlling a direction of one or more wheels of the vehicle relative to the longitudinal axis of the vehicle 110 while moving in the first direction. To give an example, if the first direction is forwards and the first object is located greater than the predetermined first distance from the vehicle 110, the front wheels of the vehicle 110 may be controlled to angle (or point) towards the first object, such that further movement in the first direction will bring the vehicle 110 closer to the first object. In another example, if the first direction is backwards and the first object is greater than the predetermined first distance from the vehicle 110, the rear wheels of the vehicle 110 may be controlled to angle (or point) away from the first object, such that further movement in the first direction will bring the vehicle 110 closer to the first object. In yet another example, if the first direction is forwards and the first object is located greater than the predetermined first distance from the vehicle 110, the front wheels of the vehicle 110 may be controlled to angle (or point) towards the first object and the rear wheels of the vehicle 110 may be controlled to angle (or point) towards the first object, such that further movement in the first direction will bring the vehicle 110 closer to the first object.

Accordingly, aligning the vehicle 110 longitudinally with the detected first object may involve moving the vehicle 110 closer to the first object. Of course, as discussed above there may be a minimum distance, being a predetermined second distance, which it may be required is maintained between the vehicle 110 and an object or feature external to the vehicle 110. Therefore, while aligning the vehicle 110 with the first object may require moving the vehicle closer to the first object such that at least a part of the vehicle 110 is within the predetermined first distance from the first object, it may also be required that no part of the vehicle 110 is moved equal to or less than the predetermined second distance from the first object.

In certain embodiments, to align the vehicle 110 longitudinally with the detected first object may additionally or alternatively comprise moving the vehicle 110 in at least the first direction while further controlling a direction of one or more wheels of the vehicle 110 relative to the longitudinal axis of the vehicle 110 until the longitudinal axis of the vehicle 110 is in parallel with a surface of the first object.

For example, aligning the vehicle 110 with the detected first object may also or instead include moving the vehicle 110 in the first direction while controlling (e.g., changing) a direction of one or more wheels of the vehicle 110 relative to the longitudinal axis such that, as the vehicle 110 continues to move in the first direction, an angle between a surface of the first object facing the vehicle 110 and the longitudinal axis of the vehicle 110 becomes smaller, until the surface of the first object and the longitudinal axis of the vehicle 110 are substantially parallel.

For example, in a case where the first direction is forwards and the alignment preference is left, if a front-left corner of the vehicle is within the predetermined first distance from a surface of the first object facing the vehicle 110 but the longitudinal axis of the vehicle 110 is not parallel with the surface of the first object: the vehicle 110 may be controlled to angle one or more wheels of the vehicle 110 (for example, the front wheel(s)) such that further movement in the first direction will cause the angle between the surface of the first object and the longitudinal axis of the vehicle 110 to become smaller. For example, the front wheels of the vehicle 110 may gradually be turned to be in parallel with the surface of the first object as the vehicle 110 moves in the first direction.

It will be appreciated that, in certain embodiments, if the vehicle 110 is not initially within the predetermined first distance from a surface of the first object facing the vehicle 110 and the longitudinal axis of the vehicle 110 is not in parallel with the surface of the first object, the vehicle 110 may be controlled to both bring the vehicle 110 within the predetermined first distance from the surface of the first object and to bring the longitudinal axis of the vehicle 110 in parallel with the surface of the first object. This may involve, for example, controlling a direction of one or more wheels of the vehicle 110 to turn the front or rear (depending on the first direction) of the vehicle 110 towards the first object such that movement of the vehicle 110 in the first direction moves the vehicle 110 closer to the first object to bring the vehicle 110 within the predetermined first distance, and then adjusting the direction of one or more wheels of the vehicle 110 to bring the vehicle 110 alongside the first object to bring the longitudinal axis of the vehicle 110 in parallel with the surface of the first object. It will be understood that the aligning of 540 (in combination with 530) results in the vehicle 110 'pulling-in' alongside the first object.

Furthermore, as indicated above, when aligned the vehicle 110 is positioned at least partly alongside the first object. Accordingly, in certain embodiments, when alignment is complete, the first object will be positioned to one side of the vehicle 110 (where said side of the vehicle 110 depends on the alignment preference), within the predetermined first distance of the vehicle 110, and with the longitudinal axis of the vehicle 110 in parallel with a surface of the first object facing the vehicle 110. In certain embodiments, to be considered as positioned at least partly alongside the first object, it may be required that a predetermined length of the vehicle 110 is alongside the first object. For example, it may be required that half of the length of the vehicle 110 is alongside the first object, where it is acceptable for the remaining length of the vehicle 110 to extend beyond or behind the first object (or, specifically, the surface of the first object to which the vehicle 110 has aligned).

Referring to 550, the method 500 comprises determining whether alignment of the vehicle 110 is complete. If alignment is determined to be complete, the method 500 proceeds to 560. If alignment is not determined to be complete, the method 500 proceeds/returns to 540. Here, in cases where 530 and 540 are grouped together, alignment not being complete may result in returning to the combined 530 and 540 operations.

It may therefore be said that operation 540 will repeat, or continue, until it is determined that alignment of the vehicle 110 is complete, as 550 will return to 540 until it is determined that alignment is complete. In an embodiment, it may be determined that alignment of the vehicle 110 is complete when the longitudinal axis of the vehicle is in parallel with the surface of the first object, the first object is detected to be within (or equal to) the predetermined first distance from the vehicle 110, and the vehicle 110 is positioned at least partly alongside the first object. This determination may be made based on sensor data from the environment sensing means 330.

Of course, it will be appreciated that an instruction could be issued to stop the vehicle 110 from aligning with the first object at any time in the method 500. Furthermore, there may exist other rules and occasions which would result in the vehicle 110 stopping. For example, if the vehicle 110 detects an unsafe or hazardous condition in the environment of the vehicle 110, the vehicle 110 may stop all movement.

In certain embodiments, when alignment is determined to be complete in 550, the vehicle 110 may be stopped in 560 (i.e., the method 500 ends). That is, the vehicle 110 may be stopped in dependence on determining alignment of the vehicle 110 to be complete. Once alignment is determined to be complete, in certain embodiments a message may be displayed by the mobile device 390 to indicate that the defined maneuver and/or alignment is completed. Optionally, the mobile device 390 may then provide one or more options for controlling a function of vehicle 110, such as allowing for remote locking of the doors of the vehicle, or control of a power mode of the vehicle (for example, turning the vehicle 110 off).

In certain embodiments, if the first object is sensed to be the predetermined second distance from the vehicle 110 and alignment of the vehicle 110 is not determined to be complete, the method 500 may comprise; stopping the vehicle 110; outputting another movement signal to cause an application of torque to one or more wheels of the vehicle 110 to move the vehicle 110 in a second direction opposite to the first direction, and turning one or more of the wheels relative to the longitudinal axis of the vehicle 110 to change an angle of the vehicle 110 in relation to the first object; and outputting the movement signal 245 to move the vehicle 110 in the first direction towards the first object while controlling a direction of one or more wheels of the vehicle 110 relative to the longitudinal axis of the vehicle 110 until the longitudinal axis of the vehicle 110 is in parallel with a surface of the first object.

Here, it may be the case that, following movement in the first direction and seeking to align with the first object, the vehicle 110 is positioned the predetermined second distance (i.e., the minimum distance) from the first object (and so is within the predetermined first distance), but is not aligned with the first object. However, further movement in the first direction so as to align the vehicle 110 with the first object would cause the vehicle 110 to move within the predetermined second distance, which may be prohibited. Accordingly, the vehicle 110 is controlled to reverse movement direction so as to move in a second direction substantially opposite to the first direction: i.e., if the first direction was forwards, the vehicle 110 is controlled to move backwards, and vice versa. This puts more distance between the vehicle 110 and the first object, moving the vehicle 110 away from the predetermined second distance. Once moved in the second direction, the vehicle 110 may control the direction of one or more wheels of the vehicle such that movement in the first direction will bring the vehicle 110 closer to the first object and further align the vehicle 110 to the first object as described above. It will be appreciated that, depending on factors such as a turning circle of the vehicle 110, this process including the reversal of movement direction may be performed more than one time, to allow for the vehicle 110 to align itself to the first object.

Additionally, in certain embodiments, when controlling the vehicle 110 to reverse its movement direction, a direction of one or more wheels of the vehicle 110 may be controlled to further facilitate alignment of the vehicle 110 to the object. For example, consider a case where the first direction is forwards, the alignment preference is set as left, the front-left corner of the vehicle to the predetermined second distance from the surface of the first object facing the vehicle 110, and the longitudinal axis of the vehicle is not in parallel with the surface of the first object. The vehicle 110 may be controlled to: change a direction of one or more wheels such that movement of the vehicle 110 in reverse (i.e., the second direction) will reduce an angle between the surface of the first object and the longitudinal axis of the vehicle 110; and move the vehicle 110 in reverse, thereby causing the vehicle 110 to move farther away from the first object than the predetermined second distance and to change an angle of approach for the vehicle 110 to the first object. Once re-oriented away from the first object (that is, farther than the predetermined second distance from the first object), the vehicle 110 may be controlled to again move forwards with alignment to the surface of the first object, as described above.

In certain embodiments, the method 500 may include avoiding one or more detected second objects in dependence on the sensor data by maintaining at least a predetermined third distance to the one or more second objects while moving the vehicle 110 in the first direction. In other words, as well as being controlled to align to a detected first object (e.g., in dependence on an alignment preference and the sensor data), the vehicle 110 may also be controlled to avoid collision (or getting too close to) another object (i.e., one or more second objects) indicated in the sensor data. Optionally, the predetermined third distance may be equal to the predetermined second distance. It will be appreciated that the second object may be an object which does not meet the criteria for being detected as a first object, or which was not detected as being the first object to align to. For example, the second object may not have a length which is equal to or greater than the predetermined first value, or may not have a height which is equal to or greater than the predetermined second value, or may not be located within a predetermined directional arc corresponding to the alignment preference and/or the first direction.

In certain embodiments, if the second object is detected to be in a path of the vehicle 110 to the detected first object, avoiding the second object comprises outputting the movement signal 245 to control a direction of one or more wheels of the vehicle 110 relative to the longitudinal axis of the vehicle 110 to bypass the second object. For example, the vehicle 110 may be controlled to maneuver around the second object. This may be done by maintaining at least the predetermined third distance between the vehicle 110 and the second object, while also maintaining the predetermined second distance between the vehicle 110 and the first object. It may be required that, to avoid the second object, the vehicle 110 may have to move away from the first object; however, it will be appreciated that, once the second object is bypassed, the vehicle 110 may be controlled to move towards the first object and align to the first object.

In certain embodiments, the movement signal 245 (referring to 530 and/or 540) may be output to move the vehicle 110 in dependence on the request signal 235 if at least one of: (a) it is determined that a device (e.g., the mobile device 390) transmitting the request signal 235 is authenticated with the vehicle 110; (b) it is determined that the vehicle 110 is unlocked and doors of the vehicle 110 are closed; (c) if it determined that a battery level of the vehicle 110 has a predetermined minimum of charge remaining; (d) if it is determined that the vehicle 110 is not connected to an electric power outlet; and (e) if it is determined that the vehicle 110 has at least an amount of fuel remaining to perform the moving of the vehicle 110 in dependence on the request signal 235.

It will be appreciated that condition (a) may relate to the device or the user of the device having completed an authentication process, such that the vehicle 110 is controlled only by a legitimate user. In certain embodiments, authentication may be achieved through a user (e.g., a driver) logging in to their account on a remote application executed by a device (e.g., mobile device 390), as well as having a vehicle key authorisation device (e.g., a key-fob associated with the vehicle 110) to validate ownership of the vehicle 110. Further to this, a pin code associated with the account must be entered by the user to ensure that the user wants to start the engine of the vehicle 110. Further, the device must have been successfully associated with (i.e., bound to) the vehicle 110 using authentication certificates prior to any maneuvers being able to take place.

Condition (b) may ensure that the vehicle 110 does not move while one or more doors of the vehicle 110 are open, which could be hazardous and detrimental to the condition of the vehicle 110. Condition (c) may ensure that the vehicle 110 does not attempt to perform the defined maneuver with alignment if there is an insufficient amount of battery charge remaining, such that the vehicle 110 does not run out of charge or goes below a predetermined amount of charge. Condition (d) ensures the vehicle 110 does not move while connected to a source of electricity; bearing in mind said connection would typically be by a wire or cable (although, in certain examples, a wireless charging method (such as wireless charging through an inductive coupling method or a resonance coupling method) may not affect the outputting of the movement signal 245 to move the vehicle 110 in dependence on the request signal 235), vehicle 110 movement while connected could be hazardous and detrimental to the condition of the vehicle 110 and/or the outlet. Condition (e), similar to condition (c), ensures that the vehicle 110 does not begin performing the defined maneuver if there is insufficient fuel in the vehicle 110 to complete the defined maneuver, thereby ensuring the vehicle 110 does not run out of fuel (or reduce remaining fuel below a predetermined amount) while attempting to perform the defined maneuver.

In certain embodiments, mobile device 390 is configured to wirelessly transmit a signal indicative of a user request for vehicle movement to the vehicle 110 (to be received by receiving means 310, for example), and the request signal 235 is output in dependence thereon. In certain embodiments, the vehicle 110 is moved in dependence on the request signal 235 if one or more of: the mobile device 390 is (and remains) within a predetermined fourth distance from the vehicle 110; a battery of the mobile device 390 has at least predetermined amount of charge remaining; and the mobile device 390 is authenticated with the vehicle 110 (similar to condition (a) described above).

Figures 6A, 6B:
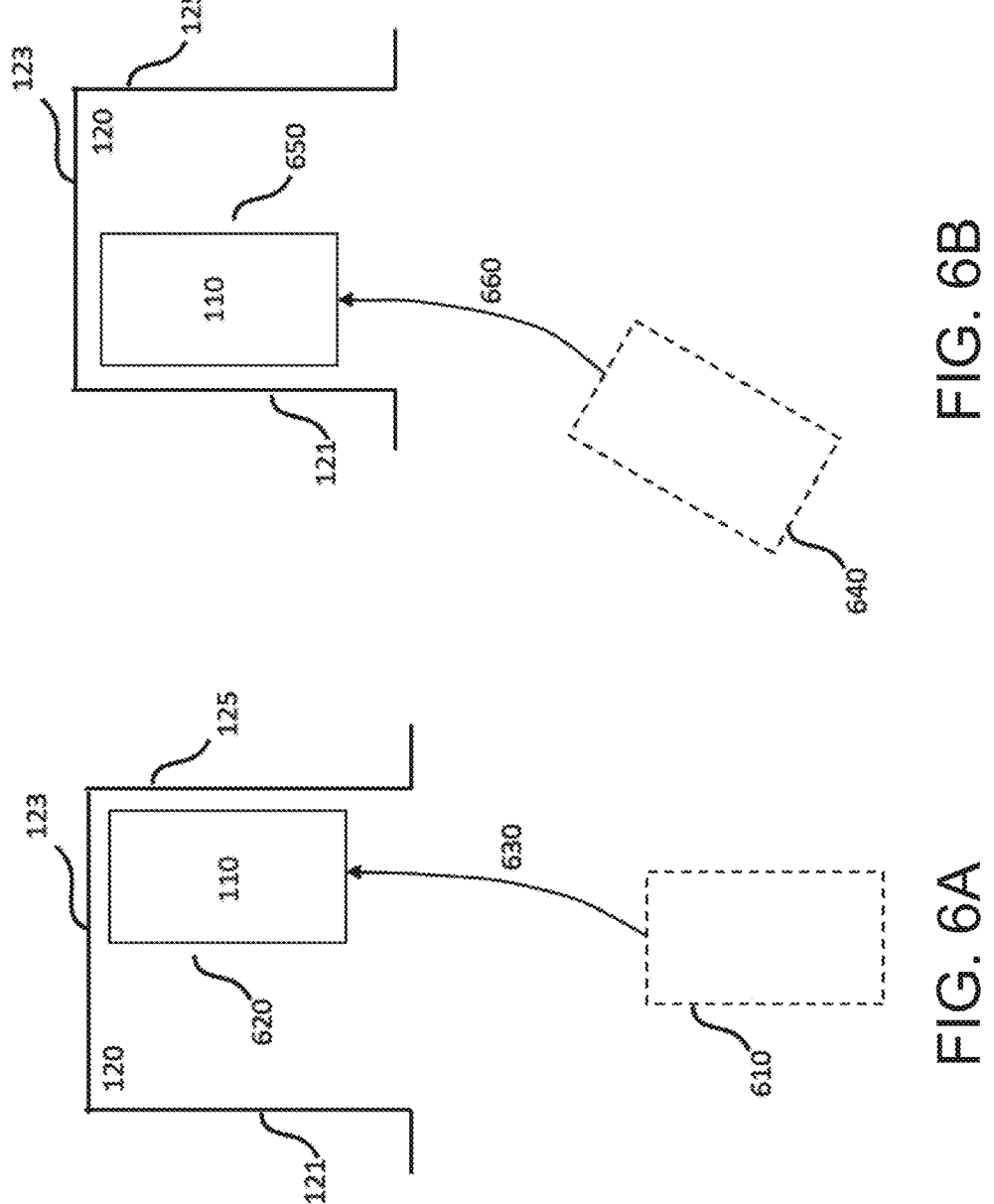

FIGS. 6A and 6B illustrate vehicle 110 after having performed a defined maneuver with alignment preference.

In FIG. 6A, the defined maneuver may have been a movement of the vehicle 110 forwards with a right alignment preference. The original position 610 of the vehicle 110 is shown, as is an indication of the approximate path 630 travelled by the vehicle 110. It is seen that the vehicle 110 has moved into parking structure 120 and finished the defined maneuver in end position 620. End position 620 may be a first distance away from second sidewall 125 and a second distance away from rear wall 123. The first distance may correspond to the predetermined first distance discussed above (optionally, the user may have specified the first distance with the alignment preference), and the second distance may correspond to the predetermined second distance discussed above. It can be seen that end position 620 is closer to second sidewall 125 than would have been the case if the vehicle 110 had moved directly forwards or backwards into the parking structure (as can be inferred from the original position 610 in FIG. 6A and from the position of the vehicle 110 in FIG. 1A). It may be said that the vehicle 110 is neatly positioned by second sidewall 125.

Accordingly, use of the alignment preference results in a more efficient positioning of the vehicle 110 in the structure 120, conserving the limited space within the location. A further advantage may arise from the capability to instruct the vehicle 110 using the mobile device 390 with the user external to the vehicle 110, meaning that the vehicle 110 can move close to second sidewall 125 without concern for leaving room for a door of the vehicle 110 to open so as to allow for exit by the user.

It will be appreciated that the defined maneuver in FIG. 6A may alternatively have been a movement of the vehicle 110 backwards with a left alignment preference. Here, the vehicle 110 would have moved backwards into the parking structure 120 from original position 610 and, upon detection of second sidewall 125 as a first object which may be aligned to according to the left alignment preference, aligned to second sidewall 125 by controlling a direction of one or more wheels so as to move closer to second sidewall 125 (i.e., to be within the predetermined first distance) while reversing and to bring the longitudinal axis of the vehicle 110 in parallel with second sidewall 125, where the aligned vehicle, in end position 620, is at least partially alongside second sidewall 125.

In FIG. 6B, the defined maneuver may have been a movement of the vehicle 110 forwards with a left alignment preference. Compared to original position 610 in FIG. 6A, the original position 640 of the vehicle 110 in FIG. 6B is at an angle to the parking structure 120 and offset from the parking structure 120. From the indication of the path 660 travelled by the vehicle 110, it can be seen that, in view of the alignment preference, the vehicle 110 has moved forwards and, upon detection of first sidewall 121 as a first object to align with, has aligned with first sidewall 121 as can be seen by end position 650. Here, it can be seen that, while moving forwards, a direction of one or more wheels of the vehicle 110 has been controlled such that the vehicle 110 has moved alongside first sidewall 121, resulting in the longitudinal axis of the vehicle 110 being in parallel with first sidewall 121.

End position 650 may be a first distance away from first sidewall 121 and a second distance away from rear wall 123. The first distance may correspond to the predetermined first distance discussed above (optionally, the user may have specified the first distance with the alignment preference), and the second distance may correspond to the predetermined second distance discussed above. It can be seen that, compared to a case where vehicle 110 simply moves directly forwards from original position 640 into parking structure 120, end position 650 is closer to first sidewall 121 and to rear wall 123 and better positioned (e.g., more-neatly) in the parking structure 120 (as can be inferred from original position 640 in FIG. 6B and from the position of the vehicle 110 in FIG. 1B). Advantageously, use of the alignment preference results in a more efficient positioning of the vehicle 110 in the structure 120, conserving the limited space within the structure.

It will be appreciated that the defined maneuver in FIG. 6A may alternatively have been a movement of the vehicle 110 backwards with a right alignment preference. Here, the vehicle 110 would have moved backwards into the parking structure 120 from original position 640 and, upon detection of first sidewall 121 as a first object which may be aligned to according to the right alignment preference, aligned to first sidewall 121 by controlling a direction of one or more wheels so as to move closer to first sidewall 121 (i.e., to be within the predetermined first distance) while reversing and to bring the longitudinal axis of the vehicle 110 in parallel with first sidewall 121; where the aligned vehicle 110, in end position 650, is at least partially alongside first sidewall 121.

As another example, referring to original position 640 in FIG. 6B, if the defined maneuver was instead a movement of the vehicle 110 forwards with a centre alignment preference, according to certain embodiments of the present disclosure the vehicle 110 would have moved forwards into the parking structure 120 from original position 640 and suitably turned so as to arrive at an end position (not shown in FIG. 6B) aligned with both the first sidewall 121 and the second sidewall 125. Further, the end position may be a first distance from the first sidewall 121 and the second sidewall 125 (optionally, the user may have specified the first distance with the alignment preference). In other words, the vehicle 110 in the end position will be centrally aligned to both the first sidewall 121 and the second sidewall 125.

It will be appreciated that various changes and modifications can be made to the present invention without departing from the scope of the present application.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for a vehicle, the control system comprising one or more controllers, the control system being arranged to:

present a plurality of options for an alignment preference to a user, at least two options of the plurality of options, at least partially, spatially overlapping;

receive a request signal indicative of a request to move the vehicle in a first direction and sensor data indicative of one or more objects in an environment of the vehicle, the request signal further indicative of the alignment preference selected by the user;

determining at least one dimension of a first object, wherein the at least one dimension of the first object includes a length of the first object taken in a dimension other than height;

determining to align the vehicle longitudinally to the first object when the length of the first object, as indicated by the sensor data, is equal to or greater than a corresponding predetermined value; and when the length of the first object is determined to be equal to or greater than the corresponding predetermined value, output a movement signal to cause an application of torque to one or more wheels of the vehicle to move the vehicle in the first direction in dependence on the request signal and to align a longitudinal axis of the vehicle with the first object in dependence on the sensor data such that the longitudinal axis of the vehicle is parallel to a direction used for taking the length of the first object, the aligned vehicle being positioned at least partly alongside the first object, a proximity of the aligned vehicle to the first object being based at least in part on the alignment preference.

2. The control system of claim 1, wherein the control system comprises one or more of:

an input circuit arranged to receive the request signal and the sensor data;

an output circuit arranged to output the movement signal; and a control circuit arranged to control at least one of the input circuit and the output circuit.

3. The control system of claim 1, wherein the length of the at least one dimension of the first object is a length of a surface of the first object and the corresponding predetermined value is a predetermined first value set in dependence on a length associated with the vehicle.

4. The control system of claim 1, wherein the control system is arranged to:

output the movement signal to control a direction of one or more wheels of the vehicle relative to the longitudinal axis of the vehicle to move the vehicle in the first direction towards the first object and to align the vehicle with the first object.

5. The control system of claim 4, wherein controlling the direction of one or more wheels of the vehicle comprises:

controlling the direction of one or more wheels of the vehicle relative to the longitudinal axis of the vehicle to angle towards the first object or to angle away from the first object.

6. The control system of claim 4, wherein aligning the vehicle with the first object comprises:

moving the vehicle in at least the first direction while further controlling a direction of one or more wheels of the vehicle relative to the longitudinal axis of the vehicle until the longitudinal axis of the vehicle is in parallel with a surface of the first object.

7. The control system of claim 6, wherein the control system is arranged to:

determine alignment of the vehicle to be complete when the longitudinal axis of the vehicle is parallel with the surface of the first object and the first object is detected to be within a predetermined first distance from the vehicle, the alignment preference indicative of the predetermined first distance; and stop the vehicle in dependence on determining alignment of the vehicle to be complete.

8. The control system of claim 7, wherein, if the first object is sensed to be a predetermined second distance from the vehicle and alignment of the vehicle is not determined to be complete, the control system is arranged to:

stop the vehicle;

output another movement signal to cause an application of torque to one or more wheels of the vehicle to move the vehicle in a second direction opposite to the first direction, and turn one or more of the wheels of the vehicle relative to the longitudinal axis of the vehicle to change an angle of the vehicle in relation to the first object; and output the movement signal to move the vehicle in the first direction towards the first object and control a direction of one or more wheels of the vehicle relative to the longitudinal axis of the vehicle until the longitudinal axis of the vehicle is parallel with a surface of the first object.

9. The control system of claim 1, wherein the first object is detected in dependence on displacement of the first object from the vehicle, as indicated by the sensor data, being within a predetermined range from the vehicle and in a predetermined directional arc from the vehicle.

10. The control system of claim 9, wherein the predetermined directional arc corresponds to the alignment preference indicated in the request signal; and wherein the alignment preference corresponds to a user selection of a direction for the vehicle to align to and the proximity of the aligned vehicle to the first object.

11. The control system of claim 10, wherein one or more of:

the request signal instructs to move the vehicle in the first direction with alignment of the vehicle in dependence on the alignment preference, the first direction being forwards or backwards;

the request signal instructs the vehicle to move a maximum distance of a predetermined number of times the length of the vehicle in the first direction; and the request signal can be used to request the vehicle to move up to a maximum of another predetermined number of times.

12. The control system of claim 1, wherein the control system is arranged to avoid a second object in dependence on the sensor data by maintaining at least a predetermined third distance to the second object while moving the vehicle in the first direction.

13. The control system of claim 12, wherein, if the second object is detected to be in a path of the vehicle to the first object, avoiding the second object comprises outputting the movement signal to control a direction of one or more wheels of the vehicle relative to the longitudinal axis of the vehicle to bypass the second object.

14. The control system of claim 1, wherein the control system is arranged to output the movement signal to move the vehicle in dependence on the request signal if at least one of:

it is determined that a device transmitting the request signal is authenticated with the vehicle;

it is determined that the vehicle is unlocked and doors of the vehicle are closed;

if it determined that a battery level of the vehicle has a predetermined minimum of charge remaining;

if it is determined that the vehicle is not connected to an electric power outlet; and if it is determined that the vehicle has at least an amount of fuel remaining to perform the moving of the vehicle in dependence on the request signal.

15. The control system of claim 1, wherein the control system is arranged to receive the request signal from a device either internal or external to the vehicle, wherein the alignment preference corresponds to a user selection via the device.

16. A vehicle comprising a control system according to claim 1.

17. A system comprising a vehicle according to claim 16 and a mobile device, wherein the mobile device is configured to wirelessly transmit a signal indicative of a user request for vehicle movement to the vehicle, and the request signal is output in dependence thereon.

18. The system of claim 17, wherein the vehicle is moved in dependence on the request signal if one or more of:

the mobile device is within a predetermined fourth distance from the vehicle while the vehicle is moving;

a battery of the mobile device has at least predetermined amount of charge remaining; and the mobile device is authenticated with the vehicle.

19. The system of claim 17, wherein the alignment preference is selected at the mobile device before the signal is transmitted to the vehicle by the mobile device.

20. A control system for a vehicle, the control system comprising one or more controllers, the control system being arranged to:

present a plurality of options for an alignment preference to a user, at least two options of the plurality of options, at least partially, spatially overlapping;

receive a request signal indicative of a request to move the vehicle in a first direction, the request signal further indicative of the alignment preference selected by the user;

receive sensor data indicative of one or more objects in an environment of the vehicle;

determining at least one dimension of a first object based on the sensor data;

determining to align the vehicle longitudinally to the first object when a length of the first object, as indicated by the sensor data, is equal to or greater than a corresponding predetermined value; and when the length of the first object is determined to be equal to or greater than the corresponding predetermined value, output a movement signal to cause an application of torque to one or more wheels of the vehicle to move the vehicle in the first direction in dependence on the request signal and to align a longitudinal axis of the vehicle with the first object in dependence on the sensor data such that the longitudinal axis of the vehicle is parallel to a direction used for taking the length of the first object, the aligned vehicle being positioned at least partly alongside the first object, a proximity of the aligned vehicle to the first object being based at least in part on the alignment preference.

\* \* \* \* \*